US006772504B2

(12) United States Patent
Weidman et al.

(10) Patent No.: US 6,772,504 B2
(45) Date of Patent: Aug. 10, 2004

(54) ROTATING MACHINE WITH COOLED HOLLOW ROTOR BARS

(75) Inventors: Roy R. Weidman, Apalachin, NY (US); Thomas Benjamin Hobbs, Nichols, NY (US)

(73) Assignee: BAE Systems Controls Inc., Johnson City, NY (US)

( * ) Notice: Subject to any disclaimer, the term of this patent is extended or adjusted under 35 U.S.C. 154(b) by 0 days.

(21) Appl. No.: 10/730,395

(22) Filed: Dec. 8, 2003

(65) Prior Publication Data

US 2004/0080218 A1 Apr. 29, 2004

Related U.S. Application Data

(62) Division of application No. 09/598,731, filed on Jun. 21, 2000.

(51) Int. Cl.[7] .............................................. H02K 17/16
(52) U.S. Cl. ........................... 29/598; 310/42; 310/211
(58) Field of Search ........................... 310/42, 211, 210, 310/75 D, 64, 60 A, 61, 57, 58, 59, 52, 54; 29/598, 596

(56) References Cited

U.S. PATENT DOCUMENTS

| 1,034,069 | A | 7/1912 | Brown ........................ 310/211 |
| 1,370,156 | A | 3/1921 | Rudenberg .................... 310/64 |
| 2,443,574 | A | 6/1948 | Burns ........................... 228/183 |
| 3,459,979 | A | 8/1969 | Dickinson .................... 310/54 |
| 3,488,532 | A | 1/1970 | Endress et al. ............... 310/58 |
| 3,629,628 | A | 12/1971 | Rank ............................ 310/54 |
| 3,659,125 | A | 4/1972 | Basel ........................... 310/54 |
| 3,800,174 | A | 3/1974 | Butterfield et al. ........... 310/61 |
| 4,728,840 | A | 3/1988 | Newhouse .................... 310/113 |
| 4,943,746 | A | 7/1990 | Scherzinger et al. .......... 310/61 |
| 5,223,757 | A | 6/1993 | Staub et al. .................. 310/54 |
| 5,670,838 | A | 9/1997 | Everton ....................... 310/254 |
| 5,729,885 | A | 3/1998 | Carosa et al. ................. 29/598 |
| 5,777,406 | A | 7/1998 | Bomba et al. ................ 310/61 |
| 5,980,650 | A | 11/1999 | Belt et al. ..................... 148/26 |
| 6,088,906 | A | * | 7/2000 | Hsu et al. ..................... 29/598 |

FOREIGN PATENT DOCUMENTS

| DE | 31 07 390 A1 | 9/1982 |
| EP | 0 649 211 A2 | 4/1995 |
| GB | 415657 | 8/1934 |
| GB | 802483 | 10/1958 |
| GB | 911170 | 11/1962 |
| JP | 54-122805 | 9/1979 |
| JP | 6-245421 | 9/1994 |
| SU | 458924 | 1/1975 |

OTHER PUBLICATIONS

Patent Abstracts of Japan, vol. 018, No. 635 For 06–245421, Sep. 2, 1994.
Patent Abstracts of Japan, vol. 003, No. 143 For 54–122805, Sep. 22, 1979.

* cited by examiner

Primary Examiner—Dang Le
(74) Attorney, Agent, or Firm—Paul J. Esatto, Jr., Esq.; Geoffrey Krauss, Esq.

(57) ABSTRACT

A rotating machine including a rotating shaft: a plurality of conductive rotor bars spaced from the rotating shaft and fixed to the rotating shaft through at least one intermediate member, where at least one of the plurality of conductive rotor bars have at least one first internal conduit; and a circulator for establishing a coolant circulation through the first internal conduit.

5 Claims, 4 Drawing Sheets

ROTATING MACHINE WITH COOLED HOLLOW ROTOR BARS

CROSS REFERENCE TO RELATED APPLICATION

This application is a divisional application of U.S. Ser. No. 09/598,731 filed on Jun. 21, 2000 the disclosure of which is incorporated herein by its reference.

BACKGROUND OF THE INVENTION

1. Field of the Invention

The present invention relates generally to rotating machines such as electric motors and generators and, more particularly, to electric motors and generators having a current-carrying stator with an induced current in a rotating inner rotor with coolant passing through the current carrying portion of the rotor.

2. Prior Art

There have been many proposals intended to improve the operation of transducers for electrical power/mechanical power conversion (motors or generators). However, there are still areas where the use of electric motors remains impractical, for example for use as the main drive of a vehicle such as a car. Current electric motors are generally too large, heavy, and produce too little power (especially at high speed) for commercial use in a vehicle such as a car.

One problem associated with electrical machines, such as electric motors, is that it is necessary to cool them because they generate heat which reduces their efficiency. The need for optimization in cooling is even more important as increases in performance demands smaller packages. At present such machines may be cooled by blowing air through or over them. For heavy duty applications it is known to spray oil onto the rotor and stator assemblies and into the gap between them using a high pressure pump. A scavenger pump may also be provided to collect the sprayed oil for re-cycling.

A common configuration for such motors is to have an inner rotor mounted on a straight shaft supported by bearings on the ends. The bearings are mounted in end covers that support and locate the rotor in the center of a current-carrying stator. The rotor contains multiple current-carrying bars which run length wise parallel to the shaft and are located near the outer circumference of the rotor. Heat is produced in the rotor when the current in the stator excites the bars. Heat dissipation limits the design of the rotor. Another method used to dissipate heat is to pass oil coolant through a hollow rotor shaft, referred to as back iron cooling. Heat generated in the rotor conductor bars is dissipated into the core of the rotor, then into the rotor shaft and then into the oil coolant flowing through the shaft and exits the rotating machine to a heat exchanger. Although this cooling method has its advantages, such as simplicity in design, it is desirable to increase the amount of heat conduction away from the rotor bars of the motor and to concentrate the cooling at the source of the heat, namely, the rotor bars.

SUMMARY OF THE INVENTION

Therefore it is an object of the present invention to provide a rotating machine with cooled hollow rotor bars which provides an increased amount of cooling than is provided by prior art methods for cooling rotating machines.

In order to increase heat conduction away from a plurality of rotor bars of a rotating machine, oil coolant is passed through the rotor bars. Oil coolant is supplied to and removed from the rotor bars via left and right end plates. The end plates are preferably round disks located on either end of the rotor. The end plates have conduits therein to allow the flow of coolant oil in the rotor bars on one end and out on the other end. Holes located in a rotating hollow shaft under each end plate and communicating with the conduits of the end plates allow oil coolant to flow in and out of the hollow shaft. A restriction located near the middle of the hollow shaft and between the end plates provides a pressure differential to divert at least a portion of the coolant oil to flow through the rotor bars.

In summary, there is provided an improved rotating machine. The improved rotating machine comprises: a rotating shaft: a plurality of conductive rotor bars spaced from the rotating shaft and fixed thereto through at least one intermediate member, at least one of the plurality of conductive rotor bars having at least one first internal conduit; and circulation means for establishing a coolant circulation through the first internal conduit.

In a preferred implementation of the rotating machine, the rotating shaft has a first wall defining a second internal conduit extending from an inlet end to an outlet end thereof. The rotating shaft further has first and second coolant holes in the wall and communicating with the second internal conduit, wherein the coolant is circulated through the first internal conduit from the second internal conduit by way of the first and second coolant holes. Furthermore, each of the plurality of conductive rotor bars have a first and second end where the at least one first internal conduit extends from the first to second end. A first end plate has a first bore in which the rotating shaft is sealingly fixed in proximity to the first coolant hole. The first end plate further has means for sealingly fixing the first end of each conductive rotor bar having the at least one first internal conduit thereto and a third internal conduit for each of the plurality of conductive rotor bars having the at least one first internal conduit for providing communication between the first coolant hole and the first end of the first internal conduit. A second end plate has a second bore in which the rotating shaft is sealingly fixed in proximity to the second cooling hole. The second end plate further has means for sealingly fixing the second end of each conductive rotor bar having the at least one first internal conduit thereto and a fourth internal conduit for each of the plurality of conductive rotor bars having the at least one first internal conduit for providing communication between the second coolant hole and the second end of the first internal conduit. Thus, the circulation of coolant is established through the first, second, third, and fourth internal conduits for each conductive rotor bar having the at least one second internal conduit.

The circulation means comprises either a full restriction plug disposed in the second internal conduit between the first and second coolant holes thereby diverting all of the fluid flow through the first, third, and fourth internal conduits for each conductive rotor bar having the at least one first internal conduit. Alternatively, the circulation means comprises a partial restriction plug disposed in the second internal conduit between the first and second coolant holes. Thus, in the alternative version, which is also the preferred implementation, a portion of the fluid flow is diverted through the first, third, and fourth internal conduits for each conductive rotor bar having the at least one first internal conduit and the remaining portion of the fluid flow continues through the second internal conduit of the rotating shaft.

In yet another preferred implementation of the rotating machine of the present invention, each of the plurality of conductive rotor bars have the at least one first internal conduit. In yet a more preferred implementation of the rotating machine of the present invention, the at least one first internal conduit comprises two first internal conduits, each extending from the first to second end of the conductive rotor bars.

In yet another preferred implementation of the rotating machine of the present invention, each of the first and second end plates further has an access bore disposed in a fluid path of the third and fourth internal conduits, respectively, for facilitating the fabrication of the third and fourth internal conduits, and wherein the first and second end plates each further comprise a cover plate sealingly covering its respective access bore.

In yet still another preferred implementation of the rotating machine of the present invention, the rotating machine further comprises: a circulation conduit connecting the inlet end of the rotating shaft to the outlet end of the rotating shaft; a pump disposed in a fluid path of the circulation conduit for establishing a fluid flow into the inlet end, through the first, second, third, and fourth internal conduits for each conductive rotor bar having the at least one first internal conduit, and out the outlet end; and a heat exchanger disposed in the fluid path of the circulation conduit for removing heat from the fluid flowing therein.

Also provided is a method for assembling the rotating machine of the present invention. The method comprises the steps of: assembling the plurality of conductive rotor bars to the at least one intermediate member and the first end of each conductive rotor bar having the at least one internal conduit to the first end plate; heating the top region of a molten salts bath such that the top region is maintained at a normal brazing temperature; only immersing the first end plate and the first ends of the plurality of conductive rotor bars into the top region of the molten salts bath; salts brazing the first end of each conductive rotor bar having the at least one internal conduit to the first end plate; either before or after the salts brazing of the first end of each conductive rotor bar having the at least one internal conduit, assembling the second end plate to the second end of each rotor bar having the at least one internal conduit to the second end plate; only immersing the second end plate and the second ends of the plurality of rotor bars into the top region of the molten salts bath; and salts brazing the second end of each conductive rotor bar having the at least one internal conduit to the second end plate.

BRIEF DESCRIPTION OF THE DRAWINGS

These and other features, aspects, and advantages of the apparatus and methods of the present invention will become better understood with regard to the following description, appended claims, and accompanying drawings where:

FIG. 2b illustrates a partial exploded view of the sectional view of FIG. 2a.

FIG. 3b illustrates an enlarged sectional view of a rotor bar of FIG. 3a.

DETAILED DESCRIPTION OF THE PREFERRED EMBODIMENT

Although this invention is applicable to numerous and various types of rotating machines, it has been found particularly useful in the environment of electric motors and generators. Therefore, without limiting the applicability of the invention to electric motors and generators, the invention will be described in such environment.

Figure 1:
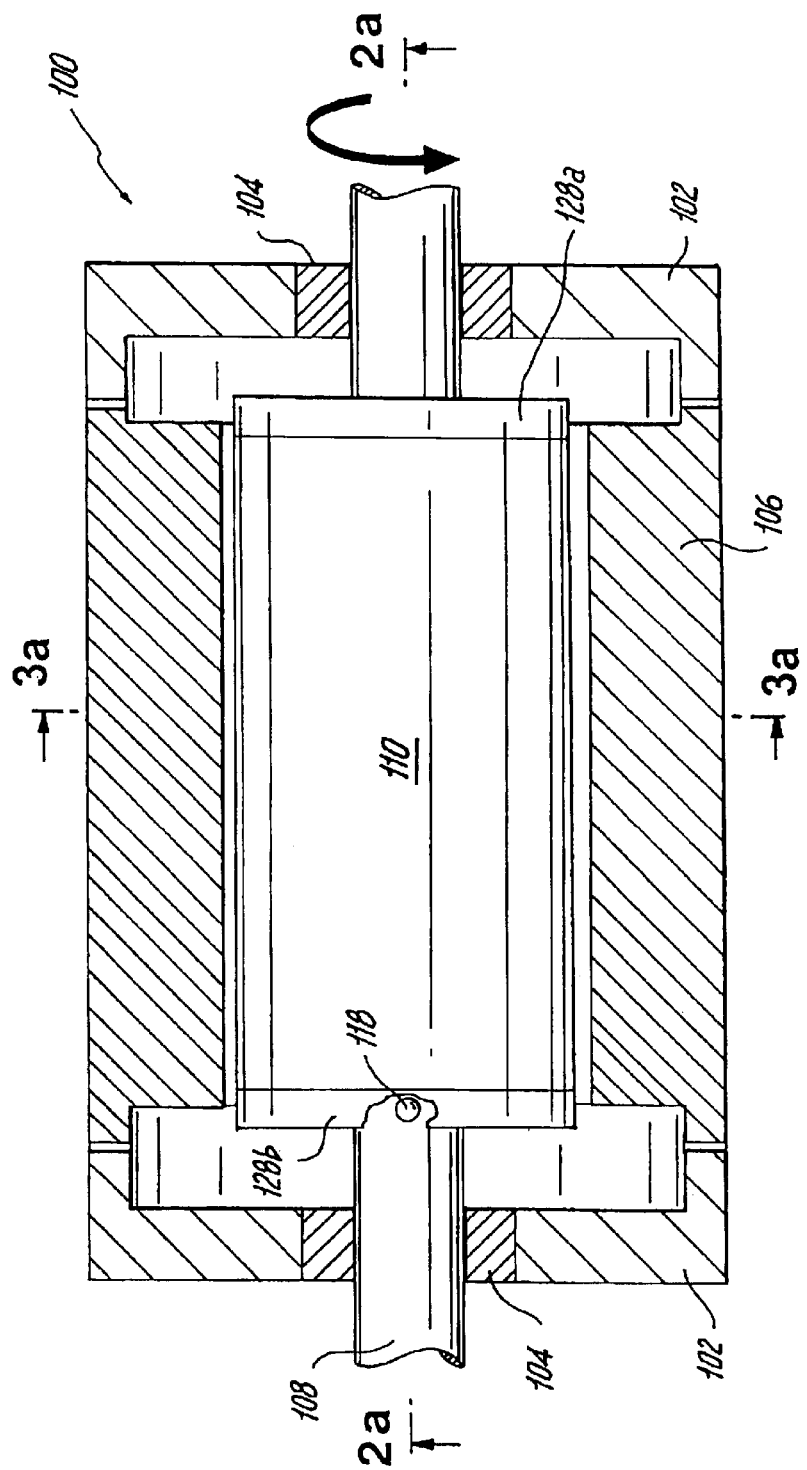
FIG. 1 illustrates a sectional view of the rotating machine of the present invention.

Referring now to FIG. 1, there is illustrated a sectional view through the end covers 102, bearings 104, and stator 106 of a rotating machine of the present invention, the rotating machine generally referred to by reference numeral 100 and depicted therein as an electric motor. The rotating machine 100 generally has a rotating shaft 108 rotatably supported in the end covers 102 by the bearings 104. The rotating shaft 108 rotates the rotor assembly 110 relative to the stator 106.

Figure 2A:
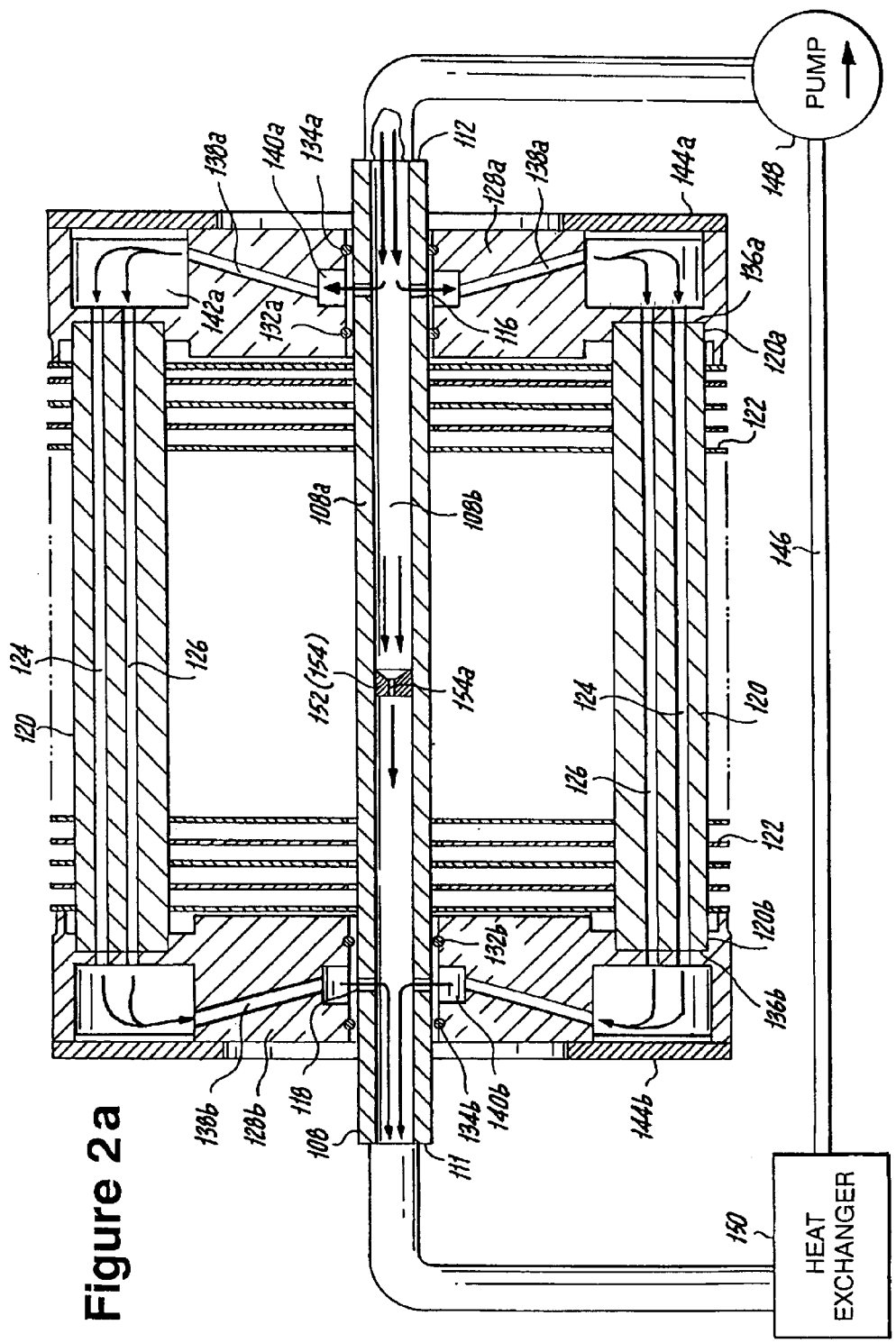
FIG. 2a illustrates a sectional view taken through line 2a—2a of FIG. 1.
Figure 2B:
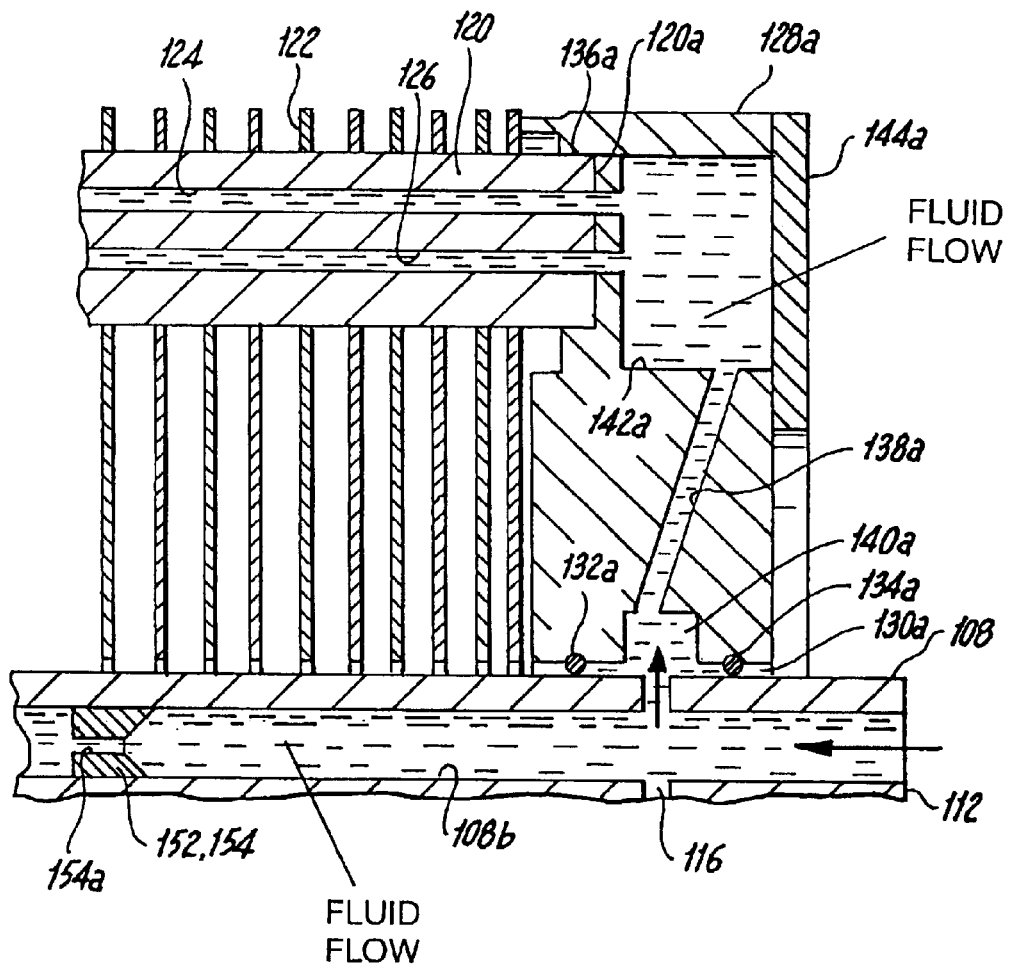

Referring now to FIGS. 2a and 2b, there is illustrated the rotor assembly 110 of FIG. 1 in greater detail. The rotating shaft 108 generally is hollow or tubular and thus has a wall 108a defining a second internal conduit 108b extending from an inlet end 112 to an outlet end 114 thereof. The second internal conduit 108b is used to carry cooling fluids, such as oil through the shaft to cool the shaft, and as will be described below, to also cool the conductive rotor bars. The fluid flow is shown as traveling in the direction from the inlet end 112 to the outlet end 114, however, those skilled in the art will recognize that the fluid flow can travel from end 114 to end 112 without departing from the spirit or scope of the present invention. The rotating shaft 108 further has first and second coolant holes 116, 118 in the wall 108a and communicating with the second internal conduit 108b.

Figure 3A:
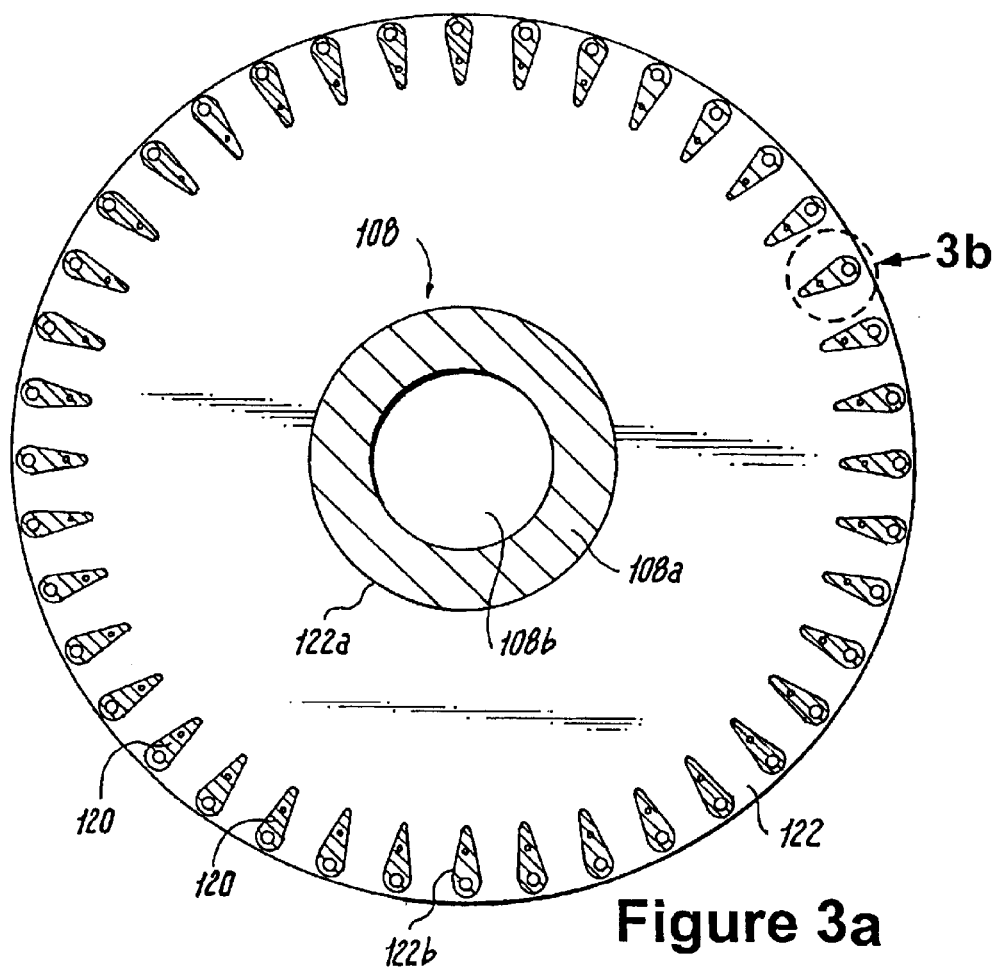
FIG. 3a illustrates a sectional view of the rotor of the rotating machine of FIG. 1 taken through line 3—3 thereof.

Referring now to FIGS. 2a, 2b, and 3a in combination, a plurality of conductive rotor bars 120 (hereinafter referred to as rotor bars) are spaced from the rotating shaft 108 and fixed thereto through at least one intermediate member. The at least one intermediate member preferably comprises a plurality of parallel stacked steel laminates 122. Each steel laminate typically has a central bore 122a for acceptance of the rotating shaft 108 therein and a slot 122b corresponding to each of the plurality of rotor bars 120 for acceptance of each of the plurality of rotor bars 120 therein. Each of the plurality of rotor bars 120 has a first and second end 120a, 120b, respectively. At least one of the plurality of rotor bars 120 has a first internal conduit 124 extending from the first to second end 120a, 120b of the rotor bar 120.

Figure 3B:
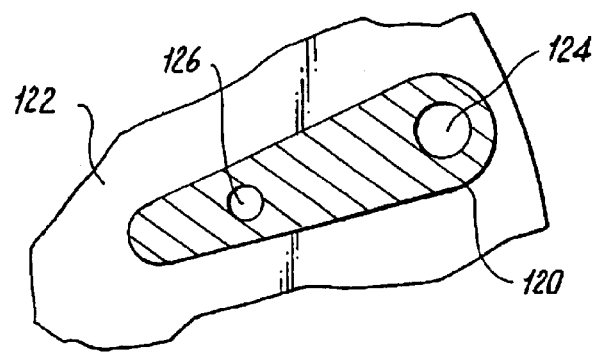

Referring now to FIG. 3b, preferably, each of the plurality of rotor bars 120 has the first internal conduit 124. More preferably, each of the rotor bars 120 has two first internal conduits 124, 126. The first internal conduits 124, 126 are preferably cylindrical (circular in cross-section) for ease of fabrication. The rotor bars are preferably teardrop-shaped as shown in FIG. 3b, having one end (closest to the stator 106) which is larger in cross-section than an opposite end. At least one of the first internal conduits is preferably located at that part of the rotor bar 120 which has the larger (or increased) cross-section. This concentrates the cooling fluid in the rotor bar at the point where heat generated is the greatest and thus increases the cooling efficiency thereof.

Referring back to FIGS. 2a and 2b, the rotor assembly 110 further has first and second end plates 128a, 128b on either ends 120a, 120b of the rotor bars 120. The first end plate 128a has a first bore 130a for accepting the rotating shaft 108. The first end plate is fixed and sealed to the rotating shaft 108 with the first end plate 128a being in proximity to the first coolant hole 116. The first end plate 128a is sealed to the rotating shaft by means of first and second o-ring seals 132a, 134a, disposed on either side of the first coolant hole 116 to prevent any fluid from flowing between the outer surface of the rotating shaft 108 and the inner surface of the first bore 130*a*. The first end plate 128*a* can be fixed to the rotating shaft 108 in any manner known in the art. Preferably, the first end plate 128*a* is shrink fit to the rotating shaft 108. Shrink fitting comprises heating the first end plate 128*a* so as to expand the diameter of the first bore 130*a* and/or (preferably, and) cooling the rotating shaft 108 so as to decrease the outer diameter thereof. The first end plate 128*a* is thereafter assembled in place on the rotating shaft 108 and the temperatures of the first end plate 128*a* and/or the rotating shaft 108 are normalized (e.g., brought to room temperature) such that the first end plate 128*a* is shrunk fit to the rotating shaft 108. The shrink fit also provides the proper o-ring squeeze to provide a proper liquid seal between the first end plate 128*a* and the rotating shaft 108.

The first end plate 128*a* further has means for sealingly fixing the first end 120*a* of each rotor bar 120, having the at least one first internal conduit 124, to the first end plate 128*a*. The rotor bars 120 are preferably located in position relative to the first end plate 128*a* by insertion of their first end 120*a* into corresponding counterbore 136*a* on the first end plate 128*a*. The counterbore 136*a* preferably has a shape and size substantially the same as the cross sectional shape and size of the rotor bar 120 so as to also orient the rotor bars 120 in their correct angular position.

The first end plate 128*a* is preferably disc-like in shape and both the first end plate 128*a* and the rotor bars 120 are fabricated from aluminum. The means for sealingly fixing the first end 120*a* of each rotor bar 120 to the first end plate 128*a* comprises a brazed joint at the juncture between the first end plate 128*a* and the first end 120*a* of the rotors 120.

The first end plate further has a third internal conduit, referred to generally by reference numeral 138*a*. The third internal conduit provides fluid communication between the first coolant hole 116 and the first end 120*a* of the first internal conduit 124 (and alternatively both second conduits 124, 126) for all of the rotor bars 120 having first internal conduit(s) 124 (126). The first end plate preferably has a groove 140*a* on the first bore 130*a* in proximity to the first coolant hole 116 so that the first coolant hole 116 is in communication with the groove 140*a* and the groove 140*a* is in communication with all of the third internal conduits 138*a*.

Preferably, the first end plate 128*a* further has an access groove 142*a* disposed in a fluid path of the third internal conduit 138*a*. Because the first end plate 138*a* is typically a thin plate, the access groove 142*a* facilitates easy fabrication of the third internal conduit 138*a*. The access groove 142*a* of the first end plate 128*a* is then sealingly covered with a cover plate 144*a*. The cover plate 142*a* is also preferably aluminum and brazed to the first end plate 128*a*.

Referring to FIG. 2*a*, similarly, the second end plate 128*b* has a second bore 130*b* for accepting the rotating shaft 108. The second end plate 128*b* is fixed and sealed to the rotating shaft 108 in the same manner as is the first end plate 128*a* but with respect to the second coolant hole 118 and the second ends 120*b* of the rotor bars 120. The second end plate 128*b* is sealed to the rotating shaft 108 by means of third and fourth o-ring seals 132*b*, 134*b*, disposed on either side of the second coolant hole 118 to prevent any fluid from flowing between the outer surface of the rotating shaft 108 and the inner surface of the second bore 130*b*.

The second end plate 128*b* further has means for sealingly fixing the second end 120*b* of each rotor bar 120 having the at least one first internal conduit 124 to the second end plate 128*b*. The rotor bars 120 are also preferably located in position relative to the second end plate 128*b* by insertion of their second end 120*a* into a corresponding counterbore 136*b* on the second end plate 128*b*. The counterbore 136*b* preferably has a shape and size substantially the same as the cross sectional shape and size of the rotor bar 120 so as to also orient the rotor bars 120 in their correct angular position.

The second end plate 128*b* is preferably disc-like in shape and both the second end plate 128*b* and the plurality of rotor bars 120 are preferably fabricated from aluminum. The means for sealingly fixing the second end 120*b* of each rotor bar 120 to the second end plate 128*b* also comprises a brazed joint at the juncture between the second end plate 128*b* and the second end 120*b* of the rotors 120.

The second end plate 128*b* further has a fourth internal conduit, referred to generally by reference numeral 138*b*. The fourth internal conduit provides fluid communication between the second coolant hole 118 and the second end 120*b* of the first internal conduit 124 (and alternatively both first internal conduits 124, 126) for all of the rotor bars 120 having first internal conduit(s) 124 (126). The second end plate preferably has a groove 140*b* on the second bore 130*b* in proximity to the second coolant hole 118 which serves the same purpose as groove 140*a*. Preferably, the second end plate 128*b*, like the first end plate 128*a*, also has an access groove 142*b* covered with a cover plate 144*b* which is also preferably aluminum and brazed to the second end plate 128*b*.

It should be apparent to those skilled in the art, that two fluid paths are established by way of the configuration of the rotating machine 100 of the present invention. A first fluid path is established through the second internal conduit 108*b* of the rotating shaft 108. A second fluid path exists from the second internal conduit 108*b*, through the third internal conduit 138*a* of the first end plate 128*a*, through the first internal conduit(s) 124 (126) of the rotor bars 120, through the fourth internal conduit 138*b* of the second end plate 128*b*, and finally back to the second internal conduit 108*b* of the rotating shaft 108.

A circulation conduit 146 connects the inlet end 112 of the rotating shaft 108 to the outlet end 114 of the rotating shaft 108 to enclose the two fluid paths allowing circulation of a coolant fluid. A pump 148 is disposed in the fluid path of the circulation conduit 146 for establishing and driving the fluid flow in the first and second fluid paths. A heat exchanger 150 is disposed in the fluid path of the circulation conduit 146 for removing heat from the coolant fluid flowing therein.

A fluid flow means is used for establishing a circulating fluid flow through either both or one of the fluid paths previously described. To achieve a fluid flow only in the second fluid path (i.e., through the end plates 128*a*, 128*b*, and rotors 120) a full restriction plug 152 is disposed in the second internal conduit 108*a* between the first and second coolant holes 116, 118 thereby diverting all of the fluid flow through the first, third, and fourth internal conduits 124 (126), 138*a*, 138*b* for each rotor bar 120 having the first internal conduit 124, (126).

However, it is preferred that both the first and second fluid flows are established thereby cooling both the rotating shaft 108 and the rotor bars 120. Both fluid flows are preferably achieved with a partial restriction plug 154 disposed in the second internal conduit 108*b* between the first and second coolant holes 116, 118. The partial restriction plug has an orifice 154*a* which creates a pressure deferential between the first and second coolant holes 116, 118 thereby diverting a portion of the fluid flow through the first, third, and fourth internal conduits 124 (126), 138*a*, 138*b* for each rotor bar 120 having the first internal conduit 124, (126) and where the remaining portion of the fluid flow continues through the second internal conduit 108b of the rotating shaft 108. Although the restriction plug is shown with the orifice 154a, it is understood that the full restriction plug 152 would not have an orifice. The pump 148 and heat exchanger 150 used as well as any fittings and connections needed for connections to and of the conduits and rotating shaft are known in the art and their descriptions omitted for the sake of brevity.

The assembly of the rotating machine 100 will now be explained with reference to FIGS. 2a and 2b. The at least one intermediate member 110 (referred to in FIG. 1, and shown in FIGS. 2a and 2b as laminations 122) is assembled to the plurality of rotor bars 120 as described below.

The first end 120a of each rotor bar 120 having the at least one first internal conduit 124 (126) is assembled into place on the first end plate 128a, preferably by placement of the first end 120a into a corresponding bore 136a. Prior to or after assembly, all of the parts to be brazed are prepared for the brazing process, such as by cleaning, fluxing, etc.

The top region of a molten salts bath is heated such that the top region is maintained at a normal brazing temperature. With the top region of the molten salts bath maintained at the proper brazing temperature, only the first end plate and the first ends of the plurality of rotor bars are immersed into the top region of the molten salts bath. The first end 120a of each rotor bar 120 having the at least one first internal conduit 124 (126) is then salts brazed to the first end plate 128a.

After the salts brazing of the first end 120a of each rotor bar 120 having the at least one first internal conduit 124 (126), the second end plate 128b is assembled to the second end 120b of each rotor bar 120 having the at least one first internal conduit 124 (126). Those skilled in the art would recognize that alternatively, both the first and second end plates 128a, 128b, can be assembled before brazing of the first end plate 128a.

Similar to the first end plate 128a, only the second end plate 128b and the second ends 120b of the plurality of rotor bars 120 are immersed into the top region of the molten salts bath. The second end 120b of each rotor bar 120 having the at least one first internal conduit 124 (126) is then salts brazed to the second end plate 128b, thereby completing the assembly.

If each of the first and second end plates 128a, 128b is provided with an access groove 142a, 142b as discussed above, then the immersion steps discussed above further include the immersion of a respective cover plate 144a, 144b and wherein the salts brazing steps include the brazing of the cover plates 144a, 144b to the respective end plates 128a, 128b to sealingly cover the access grooves 142a, 142b therein.

Finally, the first and second end plates 128a, 128b are then assembled to the rotating shaft 108. As discussed above, the preferable method for assembling the first and second end plates 128a, 128b to the rotating shaft 108 is by a shrink fit therebetween.

In summary, those skilled in the art would recognize that routing coolant through the rotor bars of the rotating machine of the present invention puts the coolant in direct contact with the source of the heat thus improving thermal dissipation and improving the design and efficiency of the rotating machine. Thus, the materials and configuration of the present invention provides an efficient, structurally sound, and producible product.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for assembling a rotating machine, the rotating machine comprising a plurality of conductive rotor bars spaced from a rotating shaft, each of the plurality of conductive rotor bars having a first and second end, at least one of the plurality of conductive rotor bars having at least one internal conduit extending from its first to second end; a first end plate having a first bore in which the rotating shaft is sealingly fixed, the first end plate further having means for sealingly fixing the first end of each conductive rotor bar having the at least one internal conduit thereto, the first end plate having fluid flow means for providing fluid flow to the first end of the internal conduit; and a second end plate having a second bore in which the rotating shaft is sealingly fixed, the second end plate further having means for sealingly fixing the second end of each conductive rotor bar having the at least one internal conduit thereto, the second end plate further having fluid flow means providing fluid flow from the second end of the internal conduit, the method comprising the steps of:

assembling the plurality of conductive rotor bars to the at least one intermediate member and the first end of each conductive rotor bar having the at least one internal conduit to the first end plate;

heating the top region of a molten salts bath such that the top region is maintained at a normal brazing temperature;

only immersing the first end plate and the first ends of the plurality of conductive rotor bars into the top region of the molten salts bath;

salts brazing the first end of each conductive rotor bar having the at least one internal conduit to the first end plate;

either before or after the salts brazing of the first end of each conductive rotor bar having the at least one internal conduit, assembling the second end plate to the second end of each rotor bar having the at least one internal conduit to the second end plate;

only immersing the second end plate and the second ends of the plurality of rotor bars into the top region of the molten salts bath; and salts brazing the second end of each conductive rotor bar having the at least one internal conduit to the second end plate.

2. The method of claim 1, wherein the fluid flow means of the first and second end plates comprises a third and fourth internal conduit, respectively, wherein the method further comprising the steps of:

providing each of the first and second end plates with an access groove disposed in a fluid path of the third and fourth internal conduits, respectively, for facilitating the fabrication of the third and fourth internal conduits; and sealingly covering each access groove with a cover plate.

3. The method of claim 2, wherein the immersion steps further include the immersion of a respective cover plate and wherein the salts brazing steps include the brazing of the cover plates to the respective end plates to sealingly cover the access grooves therein.

4. The method of claim 1, further comprising the step of assembling the first and second end plates to the rotating shaft.

5. The method of claim 4, wherein the assembling of the first and second end plates the rotating shaft comprises the steps of:

heating each of the first and second end plates so as to expand the diameter of the first and second bores therein; and/or cooling the rotating shaft so as to decrease the diameter thereof; and normalizing the temperatures of the first and second end plates and/or the rotating shaft such that the first and second end plates are shrink fit to the rotating shaft.

* * * * *